(12) United States Patent
Heeringa et al.

(10) Patent No.: US 8,138,725 B2
(45) Date of Patent: Mar. 20, 2012

(54) SIMULATED FAST RECHARGE OF POWER SUPPLY

(75) Inventors: Schelte Heeringa, Drachten (NL); Oedilius Johannes Bisschop, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 318 days.

(21) Appl. No.: 12/516,382

(22) PCT Filed: Nov. 29, 2007

(86) PCT No.: PCT/IB2007/054848
§ 371 (c)(1),
(2), (4) Date: May 27, 2009

(87) PCT Pub. No.: WO2008/068687
PCT Pub. Date: Jun. 12, 2008

(65) Prior Publication Data
US 2010/0085017 A1    Apr. 8, 2010

(30) Foreign Application Priority Data
Dec. 1, 2006   (EP) .................................... 06125184

(51) Int. Cl.
*H02J 7/04* (2006.01)
*H02J 7/16* (2006.01)

(52) U.S. Cl. ......................................... 320/149; 320/163
(58) Field of Classification Search ........................ None
See application file for complete search history.

(56) References Cited

U.S. PATENT DOCUMENTS

| 3,991,553 | A |  | 11/1976 | Bergey et al. |
|---|---|---|---|---|
| 4,536,757 | A |  | 8/1985 | Ijntema |
| 5,623,193 | A |  | 4/1997 | Lang et al. |
| 5,973,497 | A | * | 10/1999 | Bergk et al. .................... 324/428 |
| 6,201,372 | B1 |  | 3/2001 | Green, Jr. et al. |
| 6,437,549 | B1 | * | 8/2002 | Takagishi ....................... 323/282 |
| 6,724,172 | B2 |  | 4/2004 | Koo |
| 6,949,910 | B2 | * | 9/2005 | Chen .............................. 320/125 |
| 2005/0266301 | A1 |  | 12/2005 | Smith et al. |

FOREIGN PATENT DOCUMENTS

| DE | 202006010251 U1 | 8/2006 |
|---|---|---|
| EP | 1223655 A1 | 7/2002 |
| JP | 200328892 A1 | 10/2003 |
| JP | 2004318629 A | 11/2004 |

* cited by examiner

Primary Examiner — Vinh Nguyen

(57) ABSTRACT

A fraction of the battery energy is kept in reserve during operational use of a battery-powered apparatus. The motor of the apparatus is switched off when the battery has discharged to the level of this reserve fraction. The reserve is made available again for operational use when the user has recharged the apparatus for a little while. This approach 5 simulates a super fast charging operation.

13 Claims, 2 Drawing Sheets

SIMULATED FAST RECHARGE OF POWER SUPPLY

FIELD OF THE INVENTION

The invention relates to an apparatus having a rechargeable power supply. The invention also relates to a device comprising a controller for managing the power supply of the apparatus.

BACKGROUND OF THE INVENTION

Such apparatuses are well-known in the art, examples of which are described below.

U.S. Pat. No. 4,536,757, owned by Philips Electronics and herein incorporated by reference, discloses a device for signaling a specific charge condition of an accumulator battery incorporated in a battery-powered apparatus, such as a shaver equipped with a rechargeable battery. The device comprises a comparator circuit for comparing the battery voltage with a reference voltage, a switching circuit controlled by the comparator circuit, and an indicator controlled by the switching circuit. The signaling point, i.e. the charging level of the battery at which the switching circuit responds, may be selected so that, at the instant of signaling, the battery charge is still sufficient for a complete shave.

U.S. Pat. No. 5,973,497, incorporated herein by reference, discloses a method of determining and displaying the charge status of a storage battery of a battery-operated appliance, such as a razor. A time-based charge status is calculated, based at least in part on the cumulative operating time of the appliance since recharging. The battery terminal voltage is also monitored. The time-based charge status is displayed until the battery voltage indicates a low voltage condition, at which point a low-charge alert indicator is displayed only if the time-based charge status is below a predetermined level (i.e. if the cumulative operating time is above a predetermined level). Methods of detecting battery ageing and accounting for periods of excessive current flow are included. Some embodiments include the steps of waiting for a preset period of time, once the low-charge alert indicator is displayed, and then displaying a "zero"-charge status and disconnecting the power-consuming device from the storage battery unit by means of a controllable switching device. By automatically disconnecting the power-consuming device from the storage battery, the function of the appliance is suspended demonstrably to the user by draining the storage battery at a defined moment, while the storage battery is subjected to less strain when it is not deep-discharged to complete exhaustion. This residual charge of the storage battery enables components such as microprocessors or ASICs, which require a minimum voltage to perform certain basic functions, to run for some extra time, which may amount to several weeks. The power-consuming device is preferably switched off by decreasing the power consumption of the power-consuming device to zero over an extended period of time. This is advantageous, for example, with an electric shaver or hair cutter because the risk of hairs being caught by suddenly switching off the appliance can be eliminated. The reduction of speed may extend over several seconds.

U.S. Pat. No. 5,623,193, incorporated herein by reference, discloses an electric device in which an electric load is powered by a battery via an electronic switching device. A display means serves the function of indicating the charge status of the battery, and a time measurement means determines the connection time of the load to the battery. Following expiration of a predetermined connection time of the load to the battery, when the display means indicates the "zero"-charge status, the time measurement means will disconnect the electric load from the battery by means of the electronic switching device.

OBJECT AND SUMMARY OF THE INVENTION

The inventors have recognized an ergonomic problem of the known apparatuses of the type, such as cordless shavers, hair cutters, or epilation devices, cordless electric toothbrushes, battery-operated household appliances such as handheld vacuum cleaners, handheld blenders or mixers, or flashlights or torches, cordless power tools such as electric screw drivers, drills or power saws, etc. Generally, the charging time is relatively long before the apparatus is again ready for operational use, when the rechargeable power supply has been completely discharged. This long charging time is a nuisance to the user, especially when he is in a hurry. If the user nevertheless wants to proceed, he needs to operate the apparatus directly from the mains supply by using a power cord. It would therefore be advantageous to reduce the charging time to an acceptable level. The user will then experience the benefit of a short recharging time before recommencing operational use of the apparatus. There is also an advantage to the manufacturer, because the apparatus itself can be designed without a power plug inlet construction, thus reducing costs and weight.

It is therefore an object of the invention to provide an apparatus having a power-consuming component and a rechargeable power supply for powering the component. The apparatus comprises a controller for managing the power supply. The controller comprises a monitor for monitoring a capacity of the power supply. The controller is operative to enter a reserve mode when the monitor indicates that the capacity has decreased below a predetermined low level. Upon entering the reserve mode, the controller disconnects the power supply from the component. The disconnection may be gradual or abrupt. Upon recharge of the power supply in the reserve mode, the controller is further operative to reconnect the power supply to the component and keep the power supply reconnected if the capacity decreases below the predetermined low level.

The invention is based on the following rationale. A fraction of the battery energy is kept in reserve during operational use, i.e. during discharging. The apparatus component (e.g. motor, light) is switched off when the battery has discharged to the level of this reserve fraction. The reserve is made available again for operational use when the user has recharged the apparatus for a little while. This approach simulates a super fast charging operation. As the energy needed for an operational cycle, e.g. one shave of a shaver, is more than the amount of charge provided in the quick-charge time, the reserve energy is preferably made available only once or twice, depending on the amount of energy kept in reserve.

The controller is preferably operative to control the powering of the component in the reserve mode depending on a further level of the capacity upon reconnection. Under these circumstances, the powering is then made a fraction of the powering of the component when the power supply has been fully recharged. This approach is based on the following rationale. The energy needed for one operational cycle, e.g. one shave of a shaver, is more than the amount of additional charge that is provided in the quick-charge time wherein the capacity is raised to the further level. Therefore, to discourage use of the quick-charge mode and emphasize its emergency character, the powering is preferably controlled so as to be lower than normal when the apparatus is switched on before the power supply has been fully recharged. For example, the component comprises a motor which, in the reserve mode, is being actively controlled in such a manner that its number of revolutions per unit of time depends on the aforesaid further level of the capacity. As another example, the component comprises a light-emitting device. In the reserve mode, the power supply to the light-emitting device is actively controlled so as to render the light intensity or an on/off frequency dependent on the further level of the capacity.

The invention further relates to a device comprising a controller for managing a rechargeable power supply for use in the apparatus described above, and also relates to a device comprising the combination of a rechargeable power supply and a controller for managing the power supply, the combination being designed for use in the apparatus. Such devices may be provided as aftermarket add-ons or as replacement parts for older apparatuses.

BRIEF DESCRIPTION OF THE DRAWING

The invention will be explained in further detail, by way of example and with reference to the accompanying drawing, wherein.

Throughout the Figures, similar or corresponding features are indicated by the same reference numerals.

DESCRIPTION OF EMBODIMENTS

A quick-charge function is a known feature of rechargeable apparatuses, such as shavers. The purpose of this feature is to indicate when there is enough energy in the rechargeable battery for an operational cycle, e.g. one shave. If the battery is completely discharged, it takes some time before this amount of energy has been supplied to the battery. Usually, the quick-charge time for shavers is specified to be between 3 and 6 minutes. The invention describes how a quick-charge time of approximately 30 seconds can be realized for shavers. With this very short quick-charge time, it is no longer necessary to offer the option of operating the apparatus directly from the mains supply. The invention therefore offers an ergonomic advantage to its user. As another advantage, the invention makes new designs feasible that can do without a power-plug inlet construction at the apparatus, thus reducing weight and manufacturing costs.

The invention will be described hereinafter within the context of battery-powered shavers, but is equally well applicable to other battery-powered apparatuses, e.g. electric tooth brushes, cordless kitchen mixers, and other cordless tools.

It is noted that one way to achieve a short charging time, regardless of the discharge state of the battery, is to apply a very high charging current. However, this solution is commercially not interesting for many apparatuses, because the complete charging system must be overdimensioned just for carrying out this function, thus increasing costs.

According to the invention, a fraction of the battery energy is kept in reserve during operational use, i.e. during discharging. The motor of the apparatus is switched off when the battery has discharged to the level of this reserve fraction. The reserve is made available again for operational use when the user has recharged the apparatus for a little while. This approach simulates a super fast charging operation. As the energy needed for one operational cycle, e.g. one shave of a shaver, is more than the amount of charge provided in the quick-charge time, this trick is preferably performed only once or twice, depending on the amount of reserve energy. To discourage use of the quick-charge mode and emphasize its emergency character, the motor speed is preferably controlled so as to be lower than normal when the shaver is switched on before the quick-charge time has elapsed. The user thus experiences a battery with a gradually increasing voltage. Also the power drawn from the battery at low motor speed (low rpm) is lower than at full speed. A further measure of rendering the quick-charge time as short as possible is to actively control the charging current up to a certain maximum, depending on the design of the battery.

Figure 1:
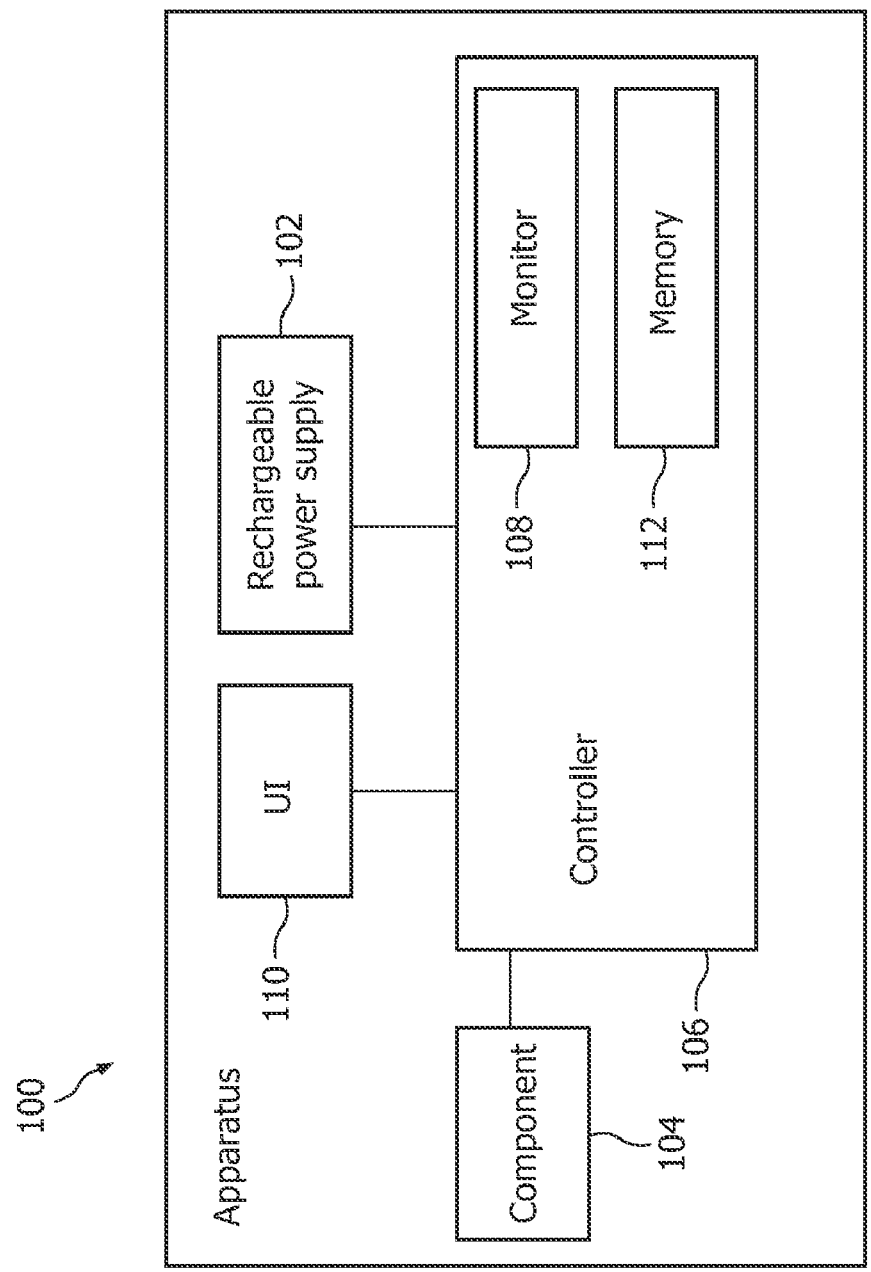
FIG. 1 is a block diagram of a battery-operated apparatus according to the invention.

FIG. 1 is a diagram of an apparatus 100 according to the invention. Apparatus 100 comprises an onboard rechargeable power supply 102, here a battery such as a nickel-cadmium or lithium-ion battery. Power supply 102 drives a component 104, e.g. an electric motor. In other embodiments, component 104 may have another functionality to be powered in operational use of apparatus 100, e.g. a light as in a flashlight or torch. In the invention, component 104 receives its power from power supply 102 under the control of a controller 106 as explained below. Controller 106 comprises a monitor 108 for monitoring a capacity of power supply 102. Monitor 108 enables controller 106 to control a user interface 110 for indicating the state of power supply 102 to the user, if and when necessary, as explained below. When monitor 108 determines that the capacity has decreased below a predetermined low level, controller 106 enters a reserve mode. In the reserve mode, controller 106 disconnects power supply 102 from component 104. Upon a recharge of power supply 102 in the reserve mode, controller 106 reconnects power supply 102 to component 104 and keeps power supply 102 reconnected if the capacity decreases below the predetermined low level. The user is thus given the impression of apparatus 100 having undergone a very quick recharge.

Controller 106 is preferably implemented by using a microcontroller and appropriate software. Alternatively, means 106 is implemented in hardware. However, a software implementation gives more flexibility in adjusting the operation to the user's particular needs, or to the particular design of apparatus 100. Means for managing battery power and/or monitoring battery status are known in the art, e.g. from U.S. Pat. Nos. 5,973,497 and 5,623,193 referred to above, and do not need to be described here in further detail.

Figure 2:
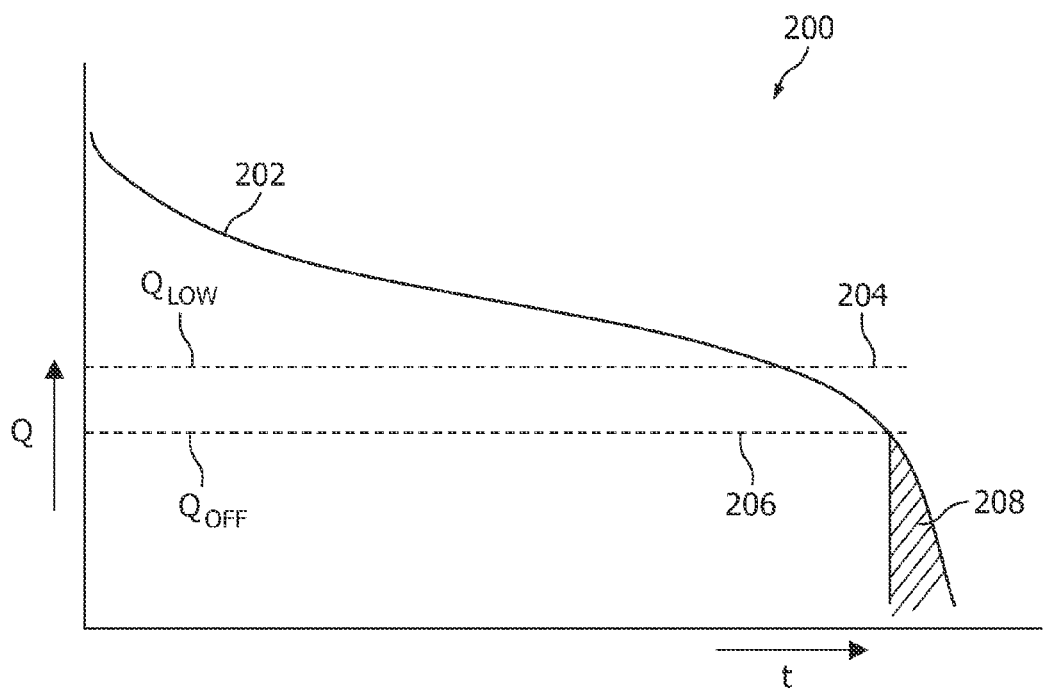
FIGS. 2 and 3 are diagrams showing relevant operational events dependent on the charge left in the battery of the apparatus.
Figure 3:
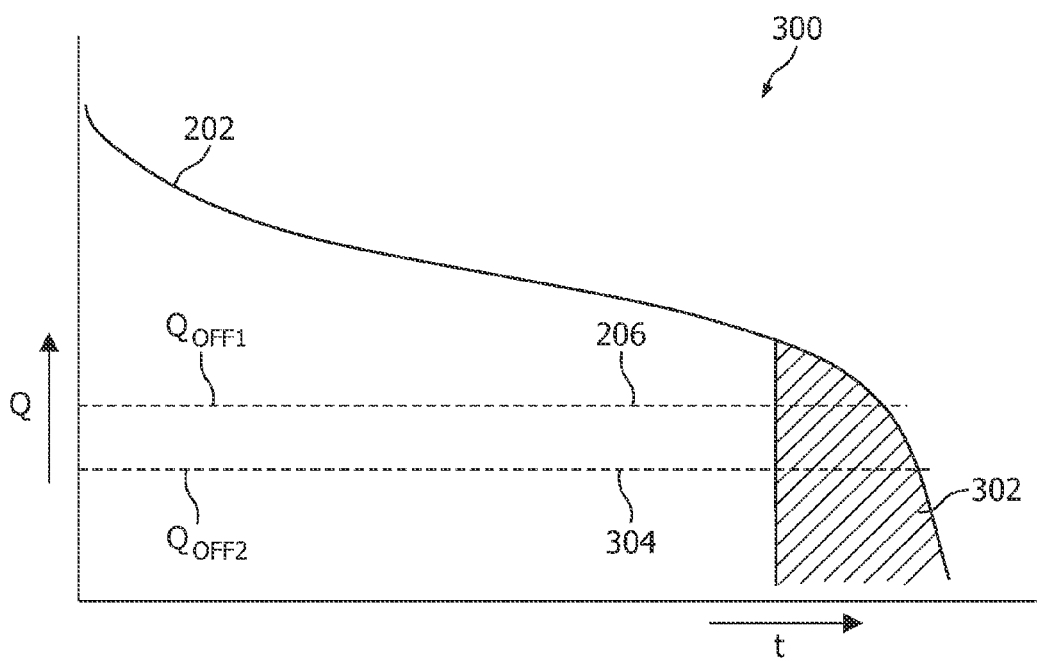

FIGS. 2 and 3 are diagrams 200 and 300 clarifying the discharge scenario in apparatus 100. Diagram 200 in FIG. 2 shows a typical curve 202 of the electric charge "Q" of battery 102 as a function of time "t" in operational use of apparatus 100. When the charge Q has reached a predetermined level 204, controller 106 is configured to give a warning indication to the user through user interface 110, namely that the electric charge of battery 102 has become low. If the user continues to operate apparatus 100, the charge Q decreases further and reaches level 206. At level 206, means 106 controls user interface 110 to signal to the user that battery 102 is empty, and also switches off the power supply to component 104. After the empty signal is given, it is no longer possible to drive component 104 from battery 102 without first recharging battery 102. There is still some charge remaining in battery 102, enough to power component 104, albeit for some short time. Hatched area 208 underneath curve 202 indicates the reserve capacity left in battery 102 upon controller 106 disconnecting battery 102 from component 104.

Diagram 300 in FIG. 3 indicates capacity 302 after a partial recharge of battery 102, e.g. after a quick recharge. Controller 106 now reconnects battery 102 to component 104 and makes capacity 302 available for operational use of apparatus 100.

Depending on the capacity level at which controller 106 disconnects battery 102 from component 104, as described with reference to FIG. 2, capacity 302 may be made fully available for operational use. Alternatively, another level 304 may be introduced, lower than level 206 described above, in order to go through another quick recharge cycle. This means that, after operational use is recommenced upon a first quick recharge cycle as described with reference to FIG. 2, controller 106 repeats the cycle of a warning via user interface 110 and disconnection of power supply 102 from component 104, now at lower capacity levels than in the scenario of FIG. 2. This has the advantage that the user now has two cycles available that give the impression of being quick-recharge cycles.

There are only a limited number of such quick-recharge operations available in apparatus 100, depending on the desired reserve capacity level, if the apparatus is designed for operational use in intermittent cycles. Such an apparatus 100 is typically in use for a limited period of time, i.e. an operational cycle, and the period of time between successive operational cycles is longer than the duration of an operational cycle. If apparatus 100 is a shaver, it is typically used for a period of a few minutes per day. If apparatus 100 is a kitchen utensil, it is typically used for a minute or so during preparation of a meal, which is once or twice a day. If apparatus 100 is a rechargeable flashlight or torch, it is typically used after sunset for, say, half an hour. If apparatus 100 is a cordless hobby tool such as a power drill or a power saw, it will be used typically for at most a few hours at a stretch every day. The number of quick-recharge cycles is limited because the capacity added during a quick recharge is lower than the capacity needed for a full operational cycle. This means that the reserve level capacity will be exhausted if a full recharge is not given, and the user keeps relying on the quick-recharge scenarios.

Controller 106 is preferably operative to control the powering of component 104 in operational use of apparatus 100 after power supply 102 has undergone a quick recharge, and the capacity of power supply 102 has not yet been fully restored. The energy needed for one operational cycle of apparatus 100, e.g. one shave of a shaver, is more than the amount of additional charge that is provided in the quick-charge time. Therefore, to discourage too frequent use of the quick-charge mode and emphasize its emergency character, controller 106 controls the powering of component 104 so as to be at a lower level than with a fully recharged battery 102, when apparatus 100 is switched on before power supply 102 has been fully recharged. Controller 106 may control user interface 110 to give a signal to the user when the quick charge has been completed.

Controller 106 controls the powering of component 104 so as to have the remaining capacity of power supply 102 become gradually available for the user after recharging. If component 104 comprises a motor, the motor speed is still recognizably lower than with a fully charged battery when the user has stopped charging after the quick-charge signal. This must encourage the user to continue charging after completing the emergency quick-charge shave. Of course, this system will fail if the user repeatedly uses the quick-charge function because the reserve capacity of battery 102 is already depleted after a limited number of quick recharges. Controller 106 tries to prevent this by lowering the motor speed even further the second time and by postponing the quick-charge completed signal.

The quick-charge function as described above can be extended by a 'ready-for-shave' signal via user interface 110. This signal can be given when battery 102 is charged with the energy for a complete shave. The motor speed is then restored to the normal value.

Controller 106 preferably has a memory 112 to log a user history. Based on e.g. the duration of operational use and the frequency of usage of the quick-charge scenario, controller 106 can determine when to enter the reserve mode, i.e. at what capacity level power supply 102 is to be disconnected from component 104. This then adjusts apparatus 100 to the needs of the individual user.

The invention claimed is:

1. An apparatus having a power-consuming component and a rechargeable power supply for powering the component, where:
   the apparatus comprises a controller for managing the power supply;
   the controller comprises a monitor for monitoring a remaining charge capacity of the power supply;
   the controller is operative to enter a reserve mode upon an indication by the monitor that the remaining charge capacity of the power supply has decreased below a predetermined low level;
   upon entering the reserve mode, the controller disconnects the power supply from the component and requires recharging of the power supply; and
   upon a partial recharge of the power supply in the reserve mode, the controller is further operative to reconnect the power supply to the component and to keep the power supply reconnected if the capacity decreases below the predetermined low level.

2. The apparatus of claim 1, where the partial recharge increases the capacity of the power supply to a level that is lower than is necessary for powering the component for an operational cycle of said component.

3. The apparatus of claim 2, where the component comprises a motor and the controller is operative to control a number of revolutions of the motor per unit of time in the reserve mode depending on the level to which the partial recharge has increased the capacity of the power supply.

4. The apparatus of claim 1, where the controller has a memory to log usage of the apparatus for determining the predetermined low level.

5. The apparatus of claim 1, where the power-consuming component comprises one of: a shaver, a tooth brush, an epilation device, a hair cutter, a power tool, a household appliance, and a flashlight.

6. A controller for use in an apparatus, the apparatus having a power-consuming component and a rechargeable power supply for powering the component, where:
   the controller is operative to manage the power supply;
   the controller comprises a monitor for monitoring a remaining charge capacity of the power supply;
   the controller is operative to enter a reserve mode upon an indication by the monitor that the remaining charge capacity of the power supply has decreased below a predetermined low level;
   upon entering the reserve mode, the controller is operative to disconnect the power supply from the component and requires recharging of the power supply; and
   upon a partial recharge of the power supply in the reserve mode, the controller is further operative to reconnect the power supply to the component and to keep the power supply reconnected if the capacity decreases below the predetermined low level.

7. The controller of claim 6 where the partial recharge increases the capacity of the power supply to a level that is lower than is necessary for powering the component for an operational cycle of said component.

8. A method for controlling the powering of a power-consuming component by a rechargeable power supply, said method comprising:

monitoring a remaining charge capacity of the power supply;

entering a reserve mode upon an indication by the monitor that the remaining charge capacity of the power supply has decreased to at least a predetermined low level at which a minimum reserve capacity is to be maintained;

upon entering the reserve mode, ceasing the powering of the component by the rechargeable power supply and requiring recharging of said power supply; and upon a partial recharge of the power supply, restarting the powering of the component by the rechargeable power supply and continuing said powering if the remaining charge capacity decreases below the predetermined low level.

9. The method of claim 8 where the partial recharge increases the capacity of the power supply to a level that is lower than is necessary for powering the component for an operational cycle of said component.

10. The method of claim 9 where the power level supplied to the component is lower than a power level that is supplied to said component when the power supply is fully recharged.

11. The method of claim 9 including recording of a user history, said history including the durations of the operational cycles for said component.

12. The method of claim 11 where said user history further includes data related to the usage of the reserve mode.

13. The method of claim 11 where said component comprises one of: a shaver, a tooth brush, an epilation device, a hair cutter, a power tool, a household appliance, and a flashlight.

* * * * *